United States Patent [19]

McDonald

[11] 4,240,602
[45] Dec. 23, 1980

[54] SUPPORT DEVICE FOR A PRESSURE VESSEL

[75] Inventor: Dennis K. McDonald, Massilon, Ohio

[73] Assignee: The Babcock & Wilcox Company, New Orleans, La.

[21] Appl. No.: 21,864

[22] Filed: Mar. 19, 1979

[51] Int. Cl.³ .............................................. F16L 3/12
[52] U.S. Cl. ...................................... 248/58; 248/62; 248/317
[58] Field of Search .................. 248/58, 59, 60, 68, 248/317, 61, 62

[56] References Cited

U.S. PATENT DOCUMENTS

| 2,974,915 | 3/1961 | Zollinger | 248/58 |
| 2,993,670 | 7/1961 | Zollinger | 248/58 |
| 3,194,590 | 7/1965 | Cook | 248/62 |
| 3,387,809 | 6/1968 | Zwerling | 248/58 |
| 3,430,909 | 3/1969 | Webb | 248/317 |
| 3,539,137 | 11/1970 | March | 248/58 |
| 3,588,021 | 6/1971 | Wormser | 248/317 |

Primary Examiner—Francis K. Zugel
Attorney, Agent, or Firm—R. J. Edwards; R. C. Mai

[57] ABSTRACT

A support structure for pressure vessels including a plate member welded to the vessel and a sleeve passing through the member and engaged by a pin and clevis type support.

3 Claims, 3 Drawing Figures

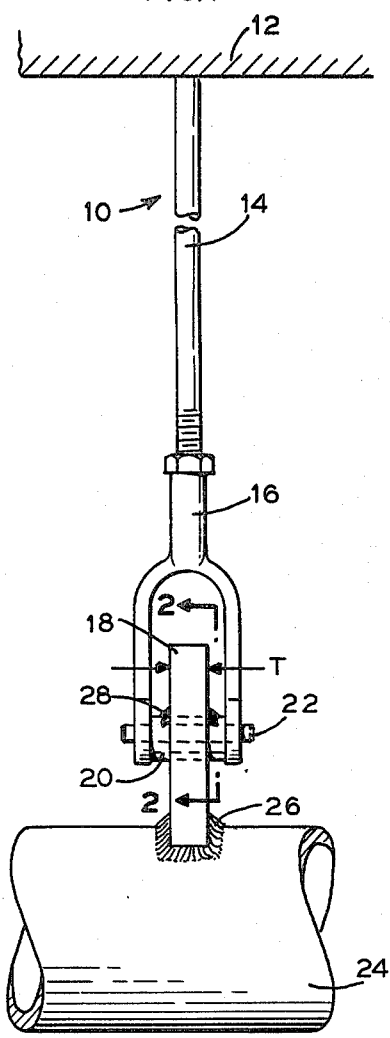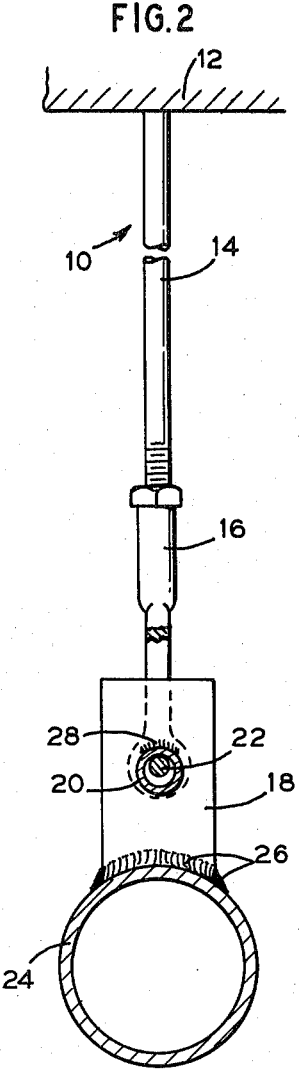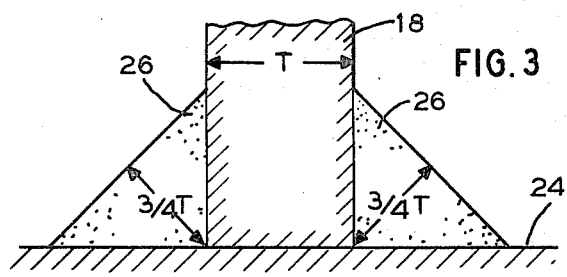

SUPPORT DEVICE FOR A PRESSURE VESSEL

TECHNICAL FIELD

The present invention relates to support devices and more particularly to a sleeve used in conjunction with a pin and clevis type support.

BACKGROUND ART

American manufacturers of steam generating equipment are governed by various codes promulgated by the engineering societies and other jurisdictional bodies among which are the applicable sections of the Boiler and Pressure Vessel Code of the American Society of Mechanical Engineers, hereinafter referred to as the Code. Section I of the Code embodies rules for construction of power boilers and a recent revision to this section, paragraph PW-16, specifies the minimum requirements for attachment welds to pressure vessels. A commonly used support structure for headers consists of a plate member or lug welded to the header, a pin and clevis engaging the lug and a support rod threaded to the clevis and connected at its opposite end to top steel. The interface between the lug and the header is governed by the Code whereas the support structure itself is designed for stress requirements and allowable loads generally as dictated by the American Institute of Steel Construction. Consequently, in the aforementioned support structure, the lug thickness is governed by bearing stresses at the clevis pin hole. However, to comply with the revised Code, the weld joining the lug to the header must have a throat dimension equal to or greater than seventy-five percent of the lug thickness. The resulting large weld sizes are generally excessive and not necessary for the structural integrity of the connection. Additional disadvantages of large welds are higher fabrication costs and more stringent quality control and non-destructive testing requirements.

SUMMARY OF THE INVENTION

The aforementioned disadvantages are overcome by the practice of this invention. Attachment plate members or lugs which are welded to a pressure vessel and which are used in conjunction with pin and clevis type supports are provided with a sleeve passing through the lug and through which a pin is inserted for engagement by a clevis thereby reducing the lug thickness and, in consequence, reducing the size of the weld attaching the lug to the pressure vessel.

BRIEF DESCRIPTION OF THE DRAWINGS

FIG. 1 is a side view of a support structure embodying the principles of the invention.

FIG. 2 is a sectional front view taken along lines 2—2 of FIG. 1.

FIG. 3 is an enlarged view of the weld junction to the pressure vessel.

DESCRIPTION OF THE PREFERRED EMBODIMENT

Referring to FIGS. 1 and 2, an assembly, 10, of support elements is shown which suspends pressure vessel 24, usually a drum or header, from top steel 12. Attached to top support steel 12 in a manner well known in the industry, is support rod 14 which, at its opposite end, is engaged with clevis 16. The extremities of clevis 16 encompass, in a known manner, a pin 22 which in turn is encompassed and extends beyond the ends of sleeve 20. Sleeve 20 passes through an opening in lug 18 and is affixed thereto by a tack weld 28. To complete the structural support of the pressure vessel 24 to the top steel 12, the lug 18 is welded, 26, to vessel 24.

FIG. 3 is an enlarged view of the welded attachment of lug 18 to pressure vessel 24 and indicates the Code requirement of the weld throat as $\frac{3}{4}$ of the thickness T of the lug 18.

In the calculation of the allowable load of the support structure, the bearing stress at the lug-sleeve interface is a function of the outside diameter of the sleeve and the thickness of the lug. Similarly, the bearing stress at the pin-sleeve interface is a function of the outside diameter of the pin and the sleeve length. Since the outside diameter of the sleeve is greater than the outside diameter of the pin, and since they are both subject to the same loading, the lug thickness can be smaller than the sleeve length, thus reducing the weld size joining the lug to the pressure vessel. It should further be noted that the sleeve length, FIG. 1, represents the required lug thickness if the sleeve were not used. An alternative design could involve increasing the pin diameter. However, this design would require non-standard clevises and substantially increase the cost of the support structure over that incorporating the sleeve.

The embodiments of the invention in which an exclusive property or privilege is claimed are defined as follows:

1. A support structure for a pressure vessel comprising a lug plate member having one end weld secured to the pressure vessel and formed with an opening, a sleeve passing through and engaging the opening, and a pin passing through and engaging the sleeve and having its opposite ends projecting beyond the sleeve and means for engaging the ends of the pin for support of the pressure vessel, the thickness of the lug plate being less than the length of the sleeve, the sleeve length constituting the required lug plate thickness if the sleeve were not used to support the vessel thereby reducing the size of the weld to the pressure vessel from that which would be required without the sleeve.

2. The support structure of claim 1 wherein the means for engaging the ends of the pin comprises a clevis.

3. The support structure of claim 2 further comprising a support rod connected at one end to the clevis and at its opposite end to supporting steel.

* * * * *